US012640015B2

(12) United States Patent
Sheth et al.

(10) Patent No.: US 12,640,015 B2
(45) Date of Patent: \*May 26, 2026

(54) SYSTEM AND METHODS FOR MANAGING GRAPHICAL USER INTERFACES FOR ONE OR MORE AUTOMATED TELLER MACHINES

(71) Applicant: Capital One Services, LLC, McLean, VA (US)

(72) Inventors: Ashay Sheth, New York, NY (US); Sagar Shah, Little Falls, NJ (US); Trevor Connolly, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/793,070

(22) Filed: Aug. 2, 2024

(65) Prior Publication Data

US 2024/0395116 A1 Nov. 28, 2024

Related U.S. Application Data

(63) Continuation of application No. 17/382,246, filed on Jul. 21, 2021, now Pat. No. 12,087,138.

(51) Int. Cl.
*G07F 19/00* (2006.01)
*G06F 3/048* (2013.01)
(Continued)

(52) U.S. Cl.
CPC ............ *G07F 19/209* (2013.01); *G06F 3/048* (2013.01); *G06N 3/02* (2013.01); *G06Q 20/1085* (2013.01); *G07F 19/206* (2013.01)

(58) Field of Classification Search
CPC .... G06Q 20/1085; G06Q 20/18; G07F 19/20; G07F 19/209; G07F 19/203; G07F 19/206

See application file for complete search history.

(56) References Cited

U.S. PATENT DOCUMENTS 7,356,477 B1 * 4/2008 Allan ................. G06Q 30/0268
705/14.4
9,489,664 B2 11/2016 Johnson
11,354,632 B1 * 6/2022 Hill ....................... H04W 12/73

FOREIGN PATENT DOCUMENTS

CN 203909899 U * 10/2014

OTHER PUBLICATIONS

Biztech, Pre-Staging Tech Improves the Speed and Security of Bank Transactions, Sep. 29, 2015 (Year: 2015).

* cited by examiner

*Primary Examiner* — Hao Fu

(74) *Attorney, Agent, or Firm* — TROUTMAN PEPPER LOCKE LLP; Christopher J. Forstner; John A. Morrissett

(57) ABSTRACT

Disclosed embodiments may include a system that may receive an indication that a user is accessing an ATM, receive, from the ATM, average session duration data over a predetermined period, generate, using a machine learning model, a busyness score for the ATM based on the average session duration data over the predetermined period, and determine whether the busyness score for the ATM exceeds a busyness score threshold. When the busyness score for the ATM does not exceed the busyness score threshold, the system may cause the ATM to present, via a first graphical user interface, a default ATM experience. When the busyness score for the ATM exceeds the busyness score threshold, the system may cause the ATM to present via, a second graphical user interface, a busy ATM experience.

20 Claims, 5 Drawing Sheets

(51) Int. Cl.
    *G06N 3/02*         (2006.01)
    *G06Q 20/10*      (2012.01)

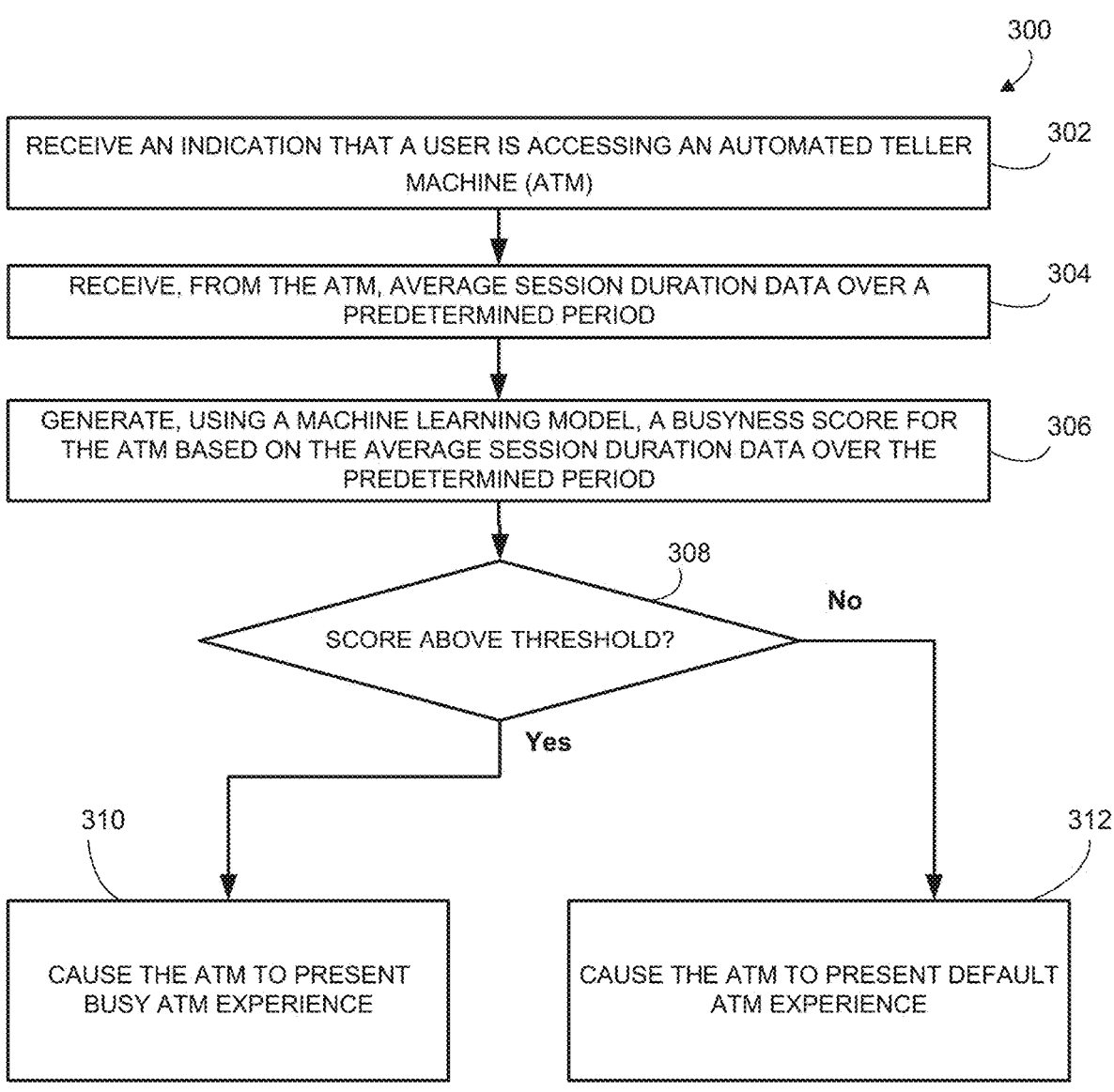

300

302
RECEIVE AN INDICATION THAT A USER IS ACCESSING AN AUTOMATED TELLER MACHINE (ATM)

304
RECEIVE, FROM THE ATM, AVERAGE SESSION DURATION DATA OVER A PREDETERMINED PERIOD

306
GENERATE, USING A MACHINE LEARNING MODEL, A BUSYNESS SCORE FOR THE ATM BASED ON THE AVERAGE SESSION DURATION DATA OVER THE PREDETERMINED PERIOD

308
SCORE ABOVE THRESHOLD?

No

Yes

310
CAUSE THE ATM TO PRESENT BUSY ATM EXPERIENCE

312
CAUSE THE ATM TO PRESENT DEFAULT ATM EXPERIENCE

FIG. 3

SYSTEM AND METHODS FOR MANAGING GRAPHICAL USER INTERFACES FOR ONE OR MORE AUTOMATED TELLER MACHINES

CROSS-REFERENCE TO RELATED APPLICATIONS

This application is a continuation of, and claims priority under 35 U.S.C. § 120 to, U.S. patent application Ser. No. 17/382,246, filed Jul. 21, 2021, the entire contents of which are fully incorporated herein by reference.

FIELD

The disclosed technology relates to systems and methods for managing graphical user interfaces for one or more automated teller machines (ATMs). In particular, the disclosed technology relates to determining when a particular ATM is busy and utilizing a busy graphical user interface (GUI) as opposed to a default GUI.

BACKGROUND

Customers want to have a seamless, quick interaction with ATMs in order to conduct routine transactions (e.g., withdraw cash, deposit checks, and check balances) and they do not want to wait in line for a long time to interact with the ATMs. Banks similarly want to make ATMs readily available to customers (especially during peak times such as rush hour or lunch time) to improve customer satisfaction and free up in person resources and personnel for less routine tasks. One way that banks can help make ATMs more readily available is to encourage customers to take advantage of mobile check deposits without needing to visit an ATM by, for example, alerting them of that option during an ATM visit or by email or other advertising. However, presenting educational content (e.g., mobile banking capabilities) during a customer's ATM visit extends that visit, which can in turn undesirably increase wait times for remaining customers.

Accordingly, there is a need for improving the GUIs of ATMs to dynamically change during busy periods to reduce the wait times of other customers. Embodiments of the present disclosure are directed to this and other considerations.

SUMMARY

Disclosed embodiments may include a system for managing or generating GUIs for one or more ATMs. The system may include one or more processors, and memory in communication with the one or more processors and storing first instructions that are configured to cause the system to perform a method for managing or generating GUIs for one or more ATMs. For example, the system may receive an indication that a user is accessing an ATM, receive, from the ATM, average session duration data over a predetermined period, generate, using a machine learning model, a busyness score for the ATM based on the average session duration data over the predetermined period, and determine whether the busyness score for the ATM exceeds a busyness score threshold. When the busyness score for the ATM does not exceed the busyness score threshold, the system may cause the ATM to present, via a first graphical user interface, an advertisement or educational content, or both. When the busyness score for the ATM exceeds the busyness score threshold, the system may cause the ATM to omit, via a second graphical user interface, the advertisement or educational content.

Disclosed embodiments may include a system for managing or generating GUIs for one or more ATMs. The system may include one or more processors, and memory in communication with the one or more processors and storing first instructions that are configured to cause the system to perform a method for managing or generating GUIs for one or more ATMs. For example, the system may receive an indication that a user is accessing an ATM, receive, from the ATM, average session duration data over a predetermined period, generate, using a machine learning model, a busyness score for the ATM based on the average session duration data over the predetermined period, determine whether the busyness score for the ATM exceeds a first busyness score threshold, and determine whether the busyness score for the ATM exceeds a second busyness score threshold. When the busyness score for the ATM does not exceed the first busyness score threshold, the system may cause the ATM to present, via a first graphical user interface, a default ATM experience (e.g., present an advertisement and/or educational content and present custom cash withdrawal options before predefined cash withdrawal options). When the busyness score for the ATM exceeds the first busyness score threshold but does not exceed the second busyness score threshold, the system may cause the ATM to present, via a second graphical user interface, a hybrid ATM experience (e.g., omit the advertisement and/or educational content and present custom cash withdrawal options before predefined cash withdrawal options). When the busyness score for the ATM exceeds the second busyness score threshold, the system may cause the ATM to present via, a third graphical user interface, a busy ATM experience (e.g., omit an advertisement and/or educational content and present predefined automatic withdrawal options before custom cash withdrawal options).

Disclosed embodiments may include a system for managing or generating GUIs for one or more ATMs. The system may include one or more processors, and memory in communication with the one or more processors and storing first instructions that are configured to cause the system to perform a method for managing or generating GUIs for one or more ATMs. For example, the system may receive an indication that a user is accessing an ATM, receive, from the ATM, average session duration data over a predetermined period, generate, using a machine learning model, a busyness score for the ATM based on the average session duration data over the predetermined period, and determine whether the busyness score for the ATM exceeds a busyness score threshold. When the busyness score for the ATM does not exceed the busyness score threshold, the system may cause the ATM to present, via a first graphical user interface, a default ATM experience (e.g., present an advertisement and/or educational content, present custom withdrawal options before predefined automatic withdrawal options, and/or prompt user to enter each individual check amount when depositing more than one check). When the busyness score for the ATM exceeds the busyness score threshold, the system may cause the ATM to present via, a second graphical user interface, a busy ATM experience (e.g., omit an advertisement and/or educational content, present predefined automatic withdrawal options before custom cash withdrawal options, and/or prompt user to enter total dollar amount of all checks being deposited rather than prompting the user for each individual check amount when depositing more than one check).

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 3 is a flow diagram illustrating an exemplary method for causing one or more ATMs to present different GUIs depending on how busy the ATM is, in accordance with certain embodiments of the disclosed technology.

DETAILED DESCRIPTION

Examples of the present disclosure relate generally to managing or generating GUIs for one or more ATMs. More particularly, examples relate to systems and methods for determining when a particular ATM is busy and utilizing a busy graphical user interface (GUI) as opposed to a default GUI. The systems and methods described herein are necessarily rooted in computer technology as they relate to dynamically generating or retrieving an appropriate GUI for a specific machine (e.g., an ATM) depending on whether the ATM is busy. In some instances, the system utilizes a machine learning model to determine when the ATM is busy. Machine learning models are a unique computer technology that involves training the models to complete a task, such as ranking or scoring how busy an ATM is by feeding the models with labeled data sets so the machine learning models learn how to rank or score the training data sets and apply the same ranking or scoring techniques to unlabeled data sets. Importantly, examples of the present disclosure improve the speed with which computers can score status data (e.g., average session duration data) an assign the appropriate GUI on a dynamic basis based on the score the machine learning model generates.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
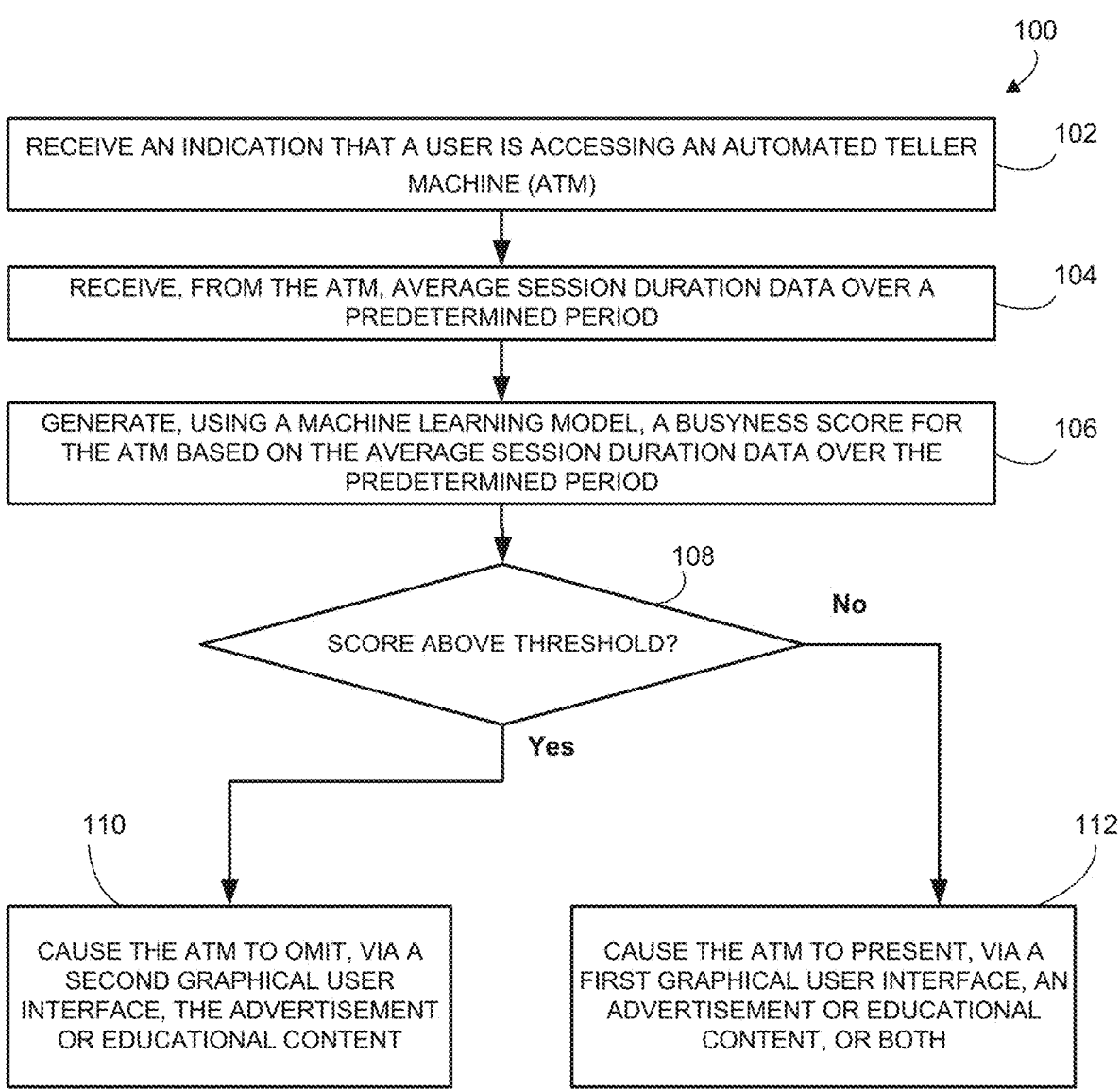
FIG. 1 is a flow diagram illustrating an exemplary method for causing one or more ATMs to present different GUIs depending on how busy the ATM is, in accordance with certain embodiments of the disclosed technology.

FIG. 1 is a flow diagram illustrating an exemplary method 100 for causing one or more ATMs to present different GUIs depending on how busy the ATM is, in accordance with certain embodiments of the disclosed technology. The steps of method 100 may be performed by one or more components of the system 500 (e.g., ATM GUI management system 420 or ATM 530 of ATM management system 508 or user device 502), as described in more detail with respect to FIGS. 4 and 5.

In block 102, the ATM GUI management system 420 may receive an indication that a user is accessing (e.g., attempted to log in to or authenticated at) an automated teller machine (ATM) 530.

In block 104, the ATM GUI management system 420 may receive from the ATM 530, average session duration data over a predetermined period (e.g., 30 minutes, 15 minutes, 10 minutes, 5 minutes). For example, the average session duration data over a 15 minute period may be 3 minutes. The ATM GUI management system 420 may receive the average system duration data from the ATM 530 in response to receiving an indication that a user is accessing the ATM 530. However, the ATM GUI management system 420 may also receive the average session duration data from the ATM 530 on a periodic basis (e.g., every 15 minutes). In some embodiments, the ATM GUI management system 420 may receive from the ATM 530 or retrieve from a database other status data in place of or in addition to the average session duration data. For example, the ATM GUI management system 420 may also receive from the ATM 530 location data associated with ATM 530, idle time between sessions, and/or average idle time between session over a predetermine period for the ATM 530. When the ATM GUI management system 420 receives any of this status data (e.g., average session duration data, location data, idle time between sessions, and/or average idle time between sessions), the ATM GUI management system 420 may store in a database such as databases 460 or 516 as historical status data. On a periodic basis or upon being triggered by a user's session at ATM 530, the ATM GUI management system 420 may retrieve the historical status data indicative of when ATM 530 is historically busy (e.g., between 4:30 pm and 6:30 pm). As explained below, the ATM GUI management system 420 may then factor the historical busyness into the considerations for scoring (or busyness level) of the ATM 530.

In block 106, the ATM GUI management system 420 may generate, using a machine learning model, a busyness score for the ATM 530 based on the average session duration data over the predetermined period. The machine learning model may be a neural network. As mentioned above, the machine learning model associated with the ATM GUI management system 420 may be provided with a status data, historical status data or both. The machine learning model make take this into account when generating the busyness score for ATM 530. In some embodiments, the ATM GUI management system 420 may not use a machine learning model to generate a busyness score and may instead assign a score proportionally based on the average session duration data. In other embodiments, the average session duration data metric is used as or in place of the busyness score.

In block 108, the ATM GUI management system 420 may determine whether the busyness score for the ATM 530 exceeds a busyness score threshold. When the ATM GUI management system 420 determines that the busyness score for the ATM 530 exceeds the busyness score threshold, the ATM GUI management system 420 proceeds to block 110. When the ATM GUI management system 420 determines that the busyness score for the ATM 530 does not exceed the threshold.

In block 110, the ATM GUI management system 420 may cause the ATM 530 to omit via a second GUI, an advertisement or educational content found in the default or first GUI. In some embodiments, the ATM GUI management system 420 may cause the ATM 530 to present the one or more predetermined cash withdrawal options (e.g., withdraw $20, $40, $60, $80, or $100) before (e.g., in a more prominent position such as top left of the display) presenting a custom cash withdrawal. In some embodiments, the ATM generating system 420 may cause the ATM 530 to present only a request for a total value of all checks being deposited rather than a request for the amount of each individual check. In some embodiments, the ATM generating system 420 may cause the ATM 530 to present a prompt for the user to use cardless capabilities of the ATM such as authenticating via a user's mobile phone rather than using a debit card. For example, the ATM generating system 420 may cause the ATM 530 to generate and display a quick response (QR) code that enables a user to quickly authenticate or facilitate a faster transaction when a user pre-stages a transaction (e.g., cash withdrawal) by using a banking mobile application on the user's mobile device to select an option to withdraw cash from a particular ATM.

In block 112, the ATM GUI management system 420 may cause the ATM 530 to present (e.g., display), via a first GUI, an advertisement or educational content, or both. In some embodiments, the ATM GUI management system 420 may cause the ATM 530 to present a custom cash withdrawal option before (e.g., in a more prominent position such as top left of the display) presenting the one or more predetermined cash withdrawal options (e.g., withdraw $20, $40, $60, $80, or $100). In some embodiments, the ATM generating system 420 may cause the ATM 530 to present one or more first requests for each individual check total being deposited. In some embodiments, the ATM GUI management system 420 may cause the ATM 530 to educational content (e.g., "Did you know that you could deposit checks remotely using your mobile banking application?" or "Did you know that you could transfer money between accounts using your mobile application?").

Figure 2:
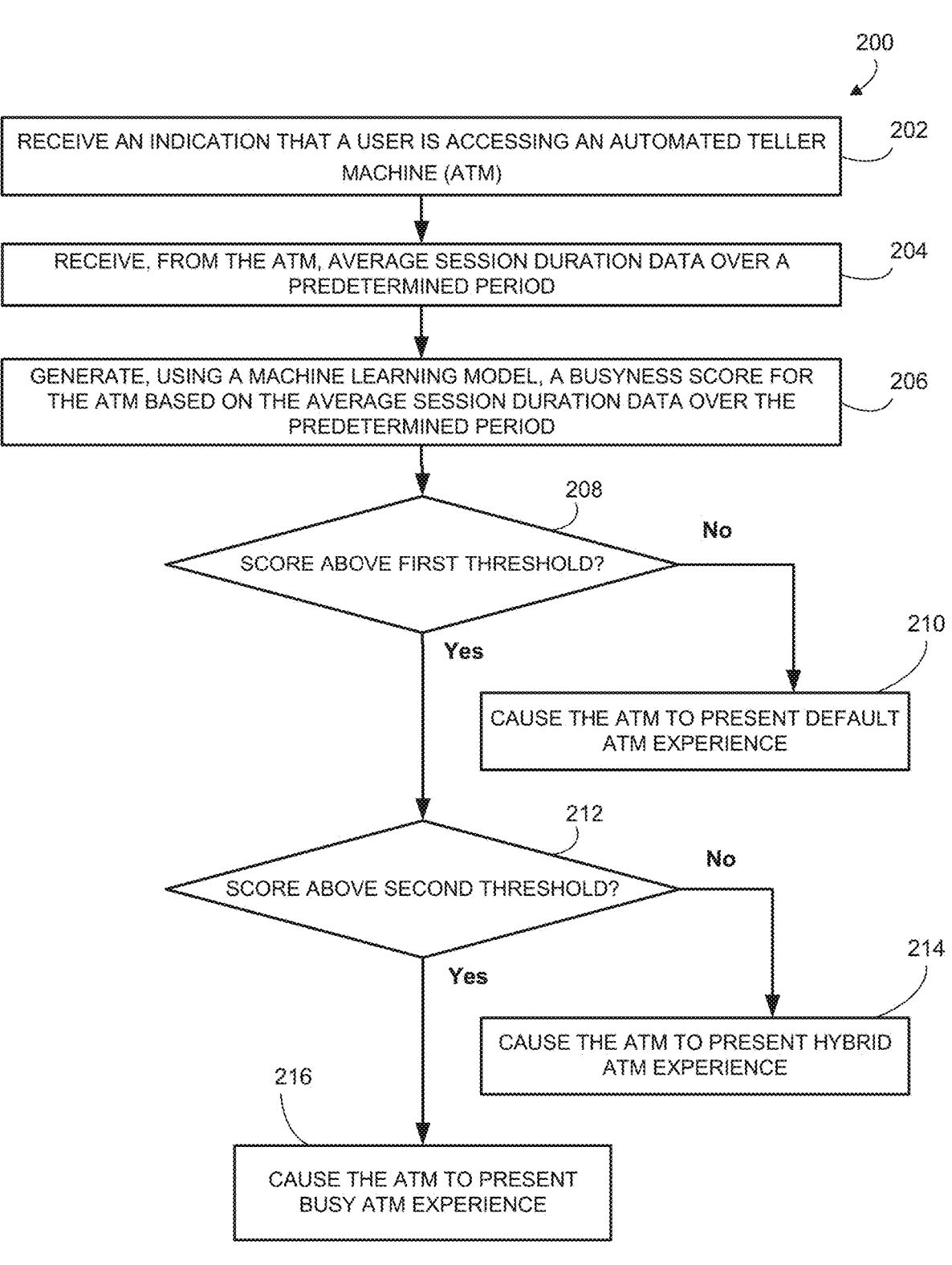
FIG. 2 is a flow diagram illustrating an exemplary method for causing one or more ATMs to present different GUIs depending on how busy the ATM is, in accordance with certain embodiments of the disclosed technology.

FIG. 2 is a flow diagram illustrating an exemplary method 100 for causing one or more ATMs to present different GUIs depending on how busy the ATM 530 is, in accordance with certain embodiments of the disclosed technology. The steps of method 200 may be performed by one or more components of the system 500 (e.g., ATM GUI management system 420 or ATM 530 of ATM management system 508 or user device 502), as described in more detail with respect to FIGS. 4 and 5.

Method 200 of FIG. 2 is similar to method 100 of FIG. 1, except that method 200 may include blocks 208, 210, 212, 214, and 216 and not include blocks 110 and 112 of method 100. The descriptions of blocks 202, 204, and 206 in method 200 are similar to the respective descriptions of blocks 102, 104, and 106 of method 100 and are not repeated herein for brevity.

In block 208, the ATM GUI management system 420 may determine whether the busyness score for the ATM exceeds a first busyness score threshold. When the ATM GUI management system determines that the busyness score for the ATM exceeds the first busyness score threshold, the ATM GUI management system 420 may proceed to block 212. When the ATM GUI management system 420 determines that the busyness score for the ATM does not exceed the first busyness score threshold, ATM GUI management system 420 may proceed to block 210.

In block 210, the ATM GUI management system 420 may cause the ATM 530 to present, via a first GUI, a default ATM experience. In some embodiments, the default ATM experience may include causing the ATM 530 to present, via the first graphical user interface, an advertisement, educational content, or both to the user and a custom cash withdrawal option before one or more predefined cash withdrawal options.

In block 212, the ATM GUI management system 420 may determine whether the busyness score for the ATM 530 exceeds a second busyness score threshold. When the ATM GUI management system 420 determines that the busyness score for the ATM exceeds the second busyness score threshold, the ATM GUI management system 420 may proceed to block 216. When the ATM GUI management system 420 determines that the busyness score for the ATM 530 does not exceed the second busyness score threshold, the ATM GUI management system 420 may proceed to block 214.

In block 214, the ATM GUI management system 420 may cause the ATM 530 to present, via a second graphical user interface, a hybrid ATM experience. In some embodiments, the hybrid ATM experience comprises causing the ATM 530 to present the custom cash withdrawal option before one or more predefined cash withdrawal options without presenting the advertisement or the educational content.

In block 216, the ATM GUI management system 420 may cause the ATM 530 to present, via a third graphical user interface, a busy ATM experience. In some embodiments, the busy ATM experience comprises causing the ATM 530 to present one or more predefined cash withdrawal options before the custom cash withdrawal option and omitting the advertisement or the educational content.

FIG. 3 is a flow diagram illustrating an exemplary method 300 for causing one or more ATMs to present different GUIs depending on how busy the ATM is, in accordance with certain embodiments of the disclosed technology. The steps of method 300 may be performed by one or more components of the system 500 (e.g., ATM GUI management system 420 or ATM 530 of ATM management system 508 or user device 502), as described in more detail with respect to FIGS. 4 and 5.

Method 300 of FIG. 3 is similar to method 100 of FIG. 1, except that method 300 may include blocks 310 and 312 in place of blocks 110 and 112 of method 100. The descriptions of blocks 302, 304, 306, and 308 in method 300 are similar to the respective descriptions of blocks 102, 104, 106, and 108 of method 100 and are not repeated herein for brevity.

In block 310, the ATM GUI management system 420 may cause the ATM 530 to present, via a first graphical user interface, a default ATM experience. In some embodiments, presenting the default ATM experience comprises causing the ATM 530 to present, via the first graphical user interface, an advertisement, educational content, or both to the user. In some embodiments, causing the ATM 530 to present the advertisement or educational content to the user occurs prior to presenting the user with options for conducting a transaction. In some embodiments, presenting the default ATM experience comprises causing the ATM 530 to present, via the first graphical user interface, custom cash withdrawal option before one or more predefined cash withdrawal options. In some embodiments, causing the ATM 530 to present the default ATM experience may include causing the ATM 530 to present, via the first graphical user interface, one or more first requests for each individual check total being deposited. In some embodiments, causing the ATM 530 to present the busy ATM experience may include causing the ATM 530 to present, via the second graphical user interface, only a second request for a total value of all checks being deposited.

In block 312, the ATM GUI management system 420 may cause the ATM 530 to present via, a second graphical user interface, a busy ATM experience. In some embodiments, the busy ATM experience omits the advertisement, educational content, or both from the busy ATM experience. In some embodiments, presenting the busy ATM experience may include presenting, via the second graphical user interface, one or more predefined cash withdrawal options before the custom cash withdrawal option. In some embodiments, causing the ATM 530 to present the busy ATM experience may include causing the ATM 530 to present, via the second graphical user interface, a prompt for the user to use cardless capabilities of the ATM 530 such as authenticating via a user's mobile phone rather than using a debit card.

Figure 4:
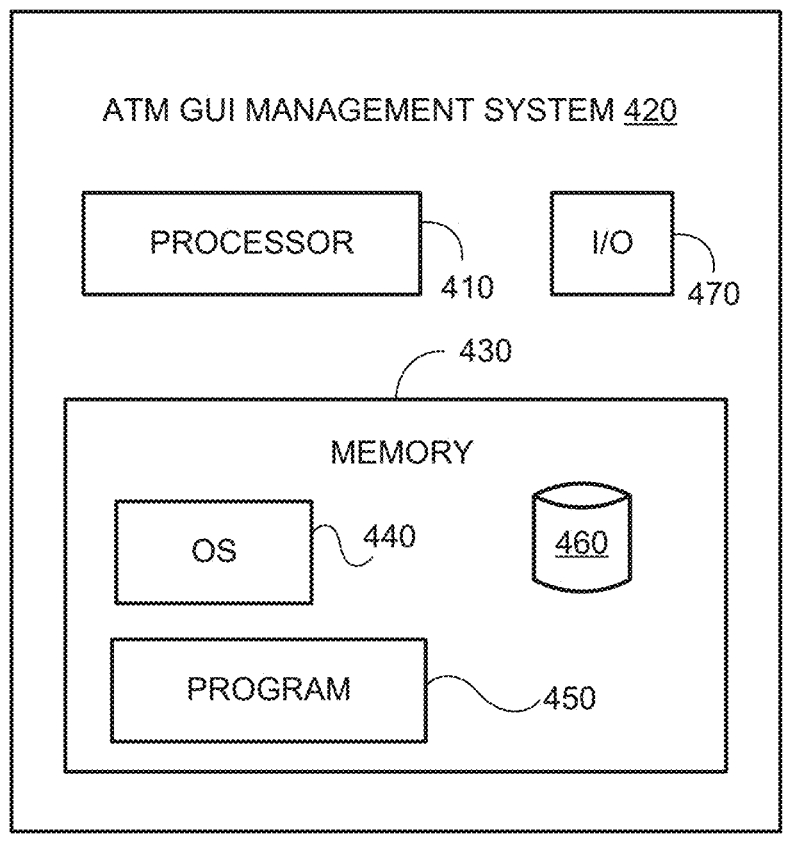
FIG. 4 is a block diagram of an example ATM GUI management system used to generate or designate a GUI for one or more ATMs, according to an example implementation of the disclosed technology.
Figure 5:
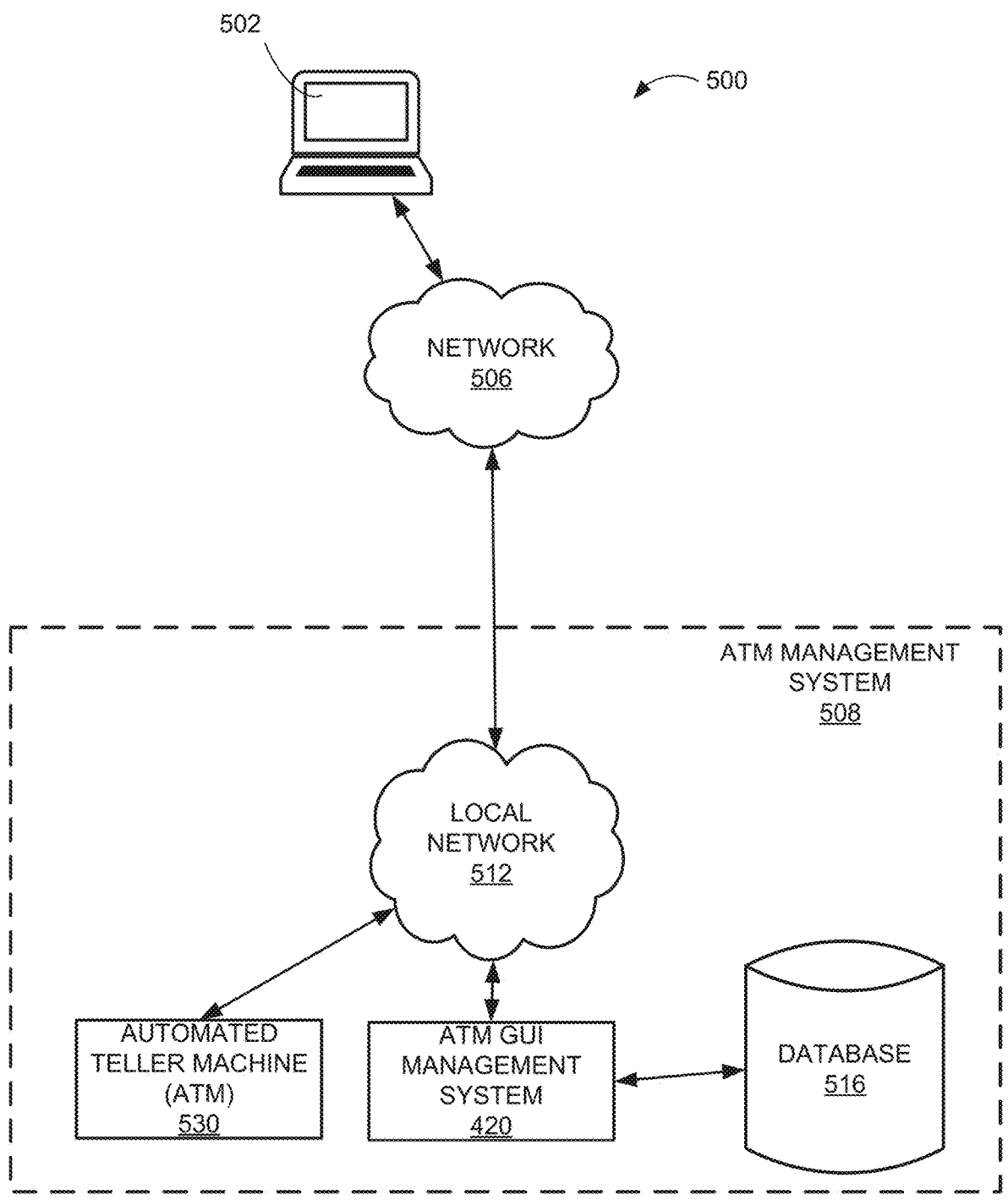
FIG. 5 is a block diagram of an example system that may be used to generate or designate a GUI for one or more ATMs, according to an example implementation of the disclosed technology.

FIG. 4 is a block diagram of an example ATM GUI management system 420 used to generate or designate a GUI for one or more ATMs, according to an example implementation of the disclosed technology. According to some embodiments, the user device 502, ATM 530, and ATM GUI management system 420, as depicted in FIG. 5 and described below, may have a similar structure and components that are similar to those described with respect to ATM GUI management system 420 shown in FIG. 4. The ATM 530 may include a display not shown. As shown, the ATM GUI management system 420 may include a processor 410, an input/output ("I/O") device 470, a memory 430 containing an operating system ("OS") 440 and a program 450. In certain example implementations, the ATM GUI management system 420 may be a single server or may be configured as a distributed computer system including multiple servers or computers that interoperate to perform one or more of the processes and functionalities associated with the disclosed embodiments. In some embodiments ATM GUI management system 420 may be one or more servers from a serverless or scaling server system. In some embodiments, the ATM GUI management system 420 may further include a peripheral interface, a transceiver, a mobile network interface in communication with the processor 410, a bus configured to facilitate communication between the various components of the ATM GUI management system 420, and a power source configured to power one or more components of the ATM GUI management system 420.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 410 to communicate with other devices via wired or wireless networks, whether local or wide area, private or public, as known in the art. A power source may be configured to provide an appropriate alternating current (AC) or direct current (DC) to power components.

The processor 410 may include one or more of a microprocessor, microcontroller, digital signal processor, co-processor or the like or combinations thereof capable of executing stored instructions and operating upon stored data. The memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 430.

The processor 410 may be one or more known processing devices, such as, but not limited to, a microprocessor from the Pentium™ family manufactured by Intel™ or the Turion™ family manufactured by AMD™. The processor 410 may constitute a single core or multiple core processor that executes parallel processes simultaneously. For example, the processor 410 may be a single core processor that is configured with virtual processing technologies. In certain embodiments, the processor 410 may use logical processors to simultaneously execute and control multiple processes. The processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the ATM GUI management system 420 may include one or more storage devices configured to store information used by the processor 410 (or other components) to perform certain functions related to the disclosed embodiments. In one example, the ATM GUI management system 420 may include the memory 430 that includes instructions to enable the processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the ATM GUI management system 420 may include a memory 430 that includes instructions that, when executed by the processor 410, perform one or more processes consistent with the functionalities disclosed herein. Methods, systems, and articles of manufacture consistent with disclosed embodiments are not limited to separate programs or computers configured to perform dedicated tasks. For example, the ATM GUI management system 420 may include the memory 430 that may include one or more programs 450 to perform one or more functions of the disclosed embodiments. For example, in some embodiments, the document classification system 420 may additionally manage dialogue and/or other interactions with the customer via a program 450.

The processor 410 may execute one or more programs located remotely from the ATM GUI management system 420. For example, the ATM GUI management system 420 may access one or more remote programs that, when executed, perform functions related to disclosed embodiments.

The memory 430 may include one or more memory devices that store data and instructions used to perform one or more features of the disclosed embodiments. The memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 430 may include software components that, when executed by the processor 410, perform one or more processes consistent with the disclosed embodiments. In some embodiments, the memory 430 may include an ATM busyness database 460 for storing related data to enable the ATM GUI management system 420 to perform one or more of the processes and functionalities associated with the disclosed embodiments.

The ATM busyness database 460 may include stored data relating to status data (e.g., average session duration data, location data, idle time between sessions, and/or average idle time between sessions) and historical status data. According to some embodiments, the functions provided by the ATM busyness database 460 may also be provided by a database that is external to the ATM GUI management system 420, such as the database 516 as shown in FIG. 5.

The ATM GUI management system 420 may also be communicatively connected to one or more memory devices (e.g., databases) locally or through a network. The remote memory devices may be configured to store information and may be accessed and/or managed by the ATM GUI management system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The ATM GUI management system 420 may also include one or more I/O devices 470 that may comprise one or more interfaces for receiving signals or input from devices and providing signals or output to one or more devices that allow data to be received and/or transmitted by the ATM GUI management system 420. For example, the ATM GUI management system 420 may include interface components, which may provide interfaces to one or more input devices, such as one or more keyboards, mouse devices, touch screens, track pads, trackballs, scroll wheels, digital cameras, microphones, sensors, and the like, that enable the ATM GUI management system 420 to receive data from a user (such as, for example, via the user device 502) or ATM 530.

In example embodiments of the disclosed technology, the ATM GUI management system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the ATM GUI management system 420 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the ATM GUI management system 420 may include a greater or lesser number of components than those illustrated.

FIG. 5 is a block diagram of an example system that may be used to generate or designate a GUI for one or more ATMs, according to an example implementation of the disclosed technology. The components and arrangements shown in FIG. 5 are not intended to limit the disclosed embodiments as the components used to implement the disclosed processes and features may vary. As shown, ATM management system 508 may interact with a user device 502 via a network 506. In certain example implementations, the ATM management system 508 may include a local network 512, an ATM GUI management system 420, an ATM 530, and a database 516.

In some embodiments, a user may operate the user device 502. The user device 502 can include one or more of a mobile device, smart phone, general purpose computer, tablet computer, laptop computer, telephone, PSTN landline, smart wearable device, voice command device, other mobile computing device, or any other device capable of communicating with the network 5506 and ultimately communicating with one or more components of the ATM management system 508. In some embodiments, the user device 502 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the ATM management system 508. According to some embodiments, the user device 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 506 may be of any suitable type, including individual connections via the internet such as cellular or WiFi networks. In some embodiments, the network 506 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 506 may include any type of computer networking arrangement used to exchange data. For example, the network 506 may be the Internet, a private data network, virtual private network using a public network, and/or other suitable connection(s) that enable(s) components in the system 500 environment to send and receive information between the components of the system 500. The network 506 may also include a public switched telephone network ("PSTN") and/or a wireless network.

The ATM management system 508 may be associated with and optionally controlled by one or more entities such as a business, corporation, individual, partnership, or any other entity that provides one or more of goods, services, and consultations to individuals such as customers. The ATM management system 508 may include one or more servers and computer systems for performing one or more functions associated with products and/or services that the organization provides.

The local network 512 may include any type of computer networking arrangement used to exchange data in a localized area, such as WiFi, Bluetooth™ Ethernet, and other suitable network connections that enable components of the ATM management system 508 to interact with one another and to connect to the network 506 for interacting with components in the system 500 environment. In some embodiments, the local network 412 may include an interface for communicating with or linking to the network 506. In other embodiments, certain components of the ATM management system 508 may communicate via the network 506, without a separate local network 506.

In accordance with certain example implementations of the disclosed technology, the ATM management system 508 may include one or more computer systems configured to compile data from a plurality of sources the ATM GUI management system 420, ATM 530, and/or the database 516. The ATM GUI management system 420 may correlate compiled data, analyze the compiled data, arrange the compiled data, generate derived data based on the compiled data, and store the compiled and derived data in a database such as the database 516. According to some embodiments, the database 516 may be a database associated with an organization and/or a related entity that stores a variety of information relating to customers, transactions, ATM, and business operations. The database 516 may also serve as a back-up storage device and may contain data and information that is also stored on, for example, database 460, as discussed with reference to FIG. 4.

Exemplary Use Cases

A user may walk up to an ATM 530 and insert a debit card. In response, the ATM 530 may transmit an indication to an ATM GUI management system 420 and average session duration data for a predetermined period (e.g., immediately preceding 15 minutes) for the ATM 530. The ATM GUI management system 420 may then generate a busyness score for the ATM 530 based on the average session duration data and potentially historical average session duration data for the ATM 530 for the particular day of the week and time of day. The ATM GUI management system 420 may determine whether the busyness score for ATM 530 is above a threshold and, if it is not, cause ATM 530 to present a default ATM experience via a default GUI (e.g., present extra material such as an advertisement, educational content, custom options). If the score is above the threshold, the ATM GUI management system 420 may cause the ATM 530 to present a busy ATM experience via a busy GUI (e.g., omit advertisements, educational content, and prioritize predefined options rather than custom options). By dynamically switching the GUI based on how busy the ATM 530 is, the ATM GUI management system 420 may decrease customer interaction time during busy periods while still spreading education to the customer based during non-busy periods through education content.

In some examples, disclosed systems or methods may involve one or more of the following clauses:

Clause 1. A system, comprising: one or more processors; and memory in communication with the one or more processors and storing instructions that are configured to cause the system to: receive an indication that a user is accessing an automated teller machine (ATM); receive, from the ATM, average session duration data over a predetermined period; generate, using a machine learning model, a busyness score for the ATM based on the average session duration data over the predetermined period; determine whether the busyness score for the ATM exceeds a busyness score threshold; when the busyness score for the ATM does not exceed the busyness score threshold, cause the ATM to present, via a first graphical user interface, an advertisement or educational content, or both; and when the busyness score for the ATM exceeds the busyness score threshold, cause the ATM to omit, via a second graphical user interface, the advertisement or educational content.

Clause 2. The system of clause 1, wherein the instructions when executed by the one or more processors are further configured to cause the system to cause the ATM to present a custom cash withdrawal option before one or more predefined cash withdrawal options when the busyness score for the ATM does not exceed the busyness score threshold.

Clause 3. The system of clause 2, wherein the instructions when executed by the one or more processors are further configured to cause the system to cause the ATM to present one or more predefined cash withdrawal options before the custom cash withdrawal option when the busyness score for the ATM exceeds the busyness score threshold.

Clause 4. The system of clause 1, wherein the instructions when executed by the one or more processors are further configured to cause the system to cause the ATM to present one or more first requests for each individual check total being deposited when the busyness score for the ATM does not exceed the busyness score threshold.

Clause 5. The system of clause 4, wherein the instructions when executed by the one or more processors are further configured to cause the system to cause the ATM to present only a second request for a total value of all checks being deposited when the busyness score for the ATM exceeds the busyness score threshold.

Clause 6. The system of clause 1, wherein the instructions when executed by the one or more processors are further configured to the ATM to present a prompt for the user to use cardless capabilities of the ATM when the busyness score for the ATM exceeds the busyness score threshold.

Clause 7. The system of clause 1, wherein the machine learning model comprises a neural network.

Clause 8. A system, comprising: one or more processors; and memory in communication with the one or more processors and storing instructions that are configured to cause the system to: receive an indication that a user is accessing an automated teller machine (ATM); receive, from the ATM, average session duration data over a predetermined period; generate, using a machine learning model, a busyness score for the ATM based on the average session duration data over the predetermined period; determine whether the busyness score for the ATM exceeds a first busyness score threshold; determine whether the busyness score for the ATM exceeds a second busyness score threshold; when the busyness score for the ATM does not exceed the first busyness score threshold, cause the ATM to present, via a first graphical user interface, a default ATM experience; when the busyness score for the ATM exceeds the first busyness score threshold but does not exceed the second busyness score threshold, cause the ATM to present, via a second graphical user interface, a hybrid ATM experience; and when the busyness score for the ATM exceeds the second busyness score threshold, cause the ATM to present via, a third graphical user interface, a busy ATM experience.

Clause 9. The system of clause 8, wherein causing the ATM to present the default ATM experience comprises causing the ATM to present, via the first graphical user interface, an advertisement, educational content, or both to the user and a custom cash withdrawal option before one or more predefined cash withdrawal options.

Clause 10. The system of clause 9, wherein: causing the ATM to present the hybrid ATM experience comprises causing the ATM to present the custom cash withdrawal option before one or more predefined cash withdrawal options without presenting the advertisement or the educational content, and causing the ATM to present the busy ATM experience comprises causing the ATM to present one or more predefined cash withdrawal options before the custom cash withdrawal option and omitting the advertisement or the educational content.

Clause 11. A system, comprising: one or more processors; and memory in communication with the one or more processors and storing instructions that are configured to cause the system to: receive an indication that a user is accessing an automated teller machine (ATM); receive, from the ATM, average session duration data over a predetermined period; generate, using a machine learning model, a busyness score for the ATM based on the average session duration data over the predetermined period; determine whether the busyness score for the ATM exceeds a busyness score threshold; when the busyness score for the ATM does not exceed the busyness score threshold, cause the ATM to present, via a first graphical user interface, a default ATM experience; and when the busyness score for the ATM exceeds the busyness score threshold, cause the ATM to present via, a second graphical user interface, a busy ATM experience.

Clause 12. The system of clause 11, wherein causing the ATM to present the default ATM experience comprises causing the ATM to present, via the first graphical user interface, an advertisement, educational content, or both to the user.

Clause 13. The system of clause 12, wherein causing the ATM to present the advertisement or educational content to the user occurs prior to presenting the user with options for conducting a transaction.

Clause 14. The system of clause 12, wherein the busy ATM experience omits the advertisement, educational content, or both.

Clause 15. The system of clause 11, wherein causing the ATM to present the default ATM experience comprises causing the ATM to present, via the first graphical user interface, custom cash withdrawal option before one or more predefined cash withdrawal options.

Clause 16. The system of clause 15, wherein causing the ATM to present the busy ATM experience comprises causing the ATM to present, via the second graphical user interface, one or more predefined cash withdrawal options before the custom cash withdrawal option.

Clause 17. The system of clause 11, wherein causing the ATM to present the default ATM experience comprises causing the ATM to present, via the first graphical user interface, one or more first requests for each individual check total being deposited.

Clause 18. The system of clause 17, wherein causing the ATM to present the busy ATM experience comprises causing the ATM to present, via the second graphical user interface, only a second request for a total value of all checks being deposited.

Clause 19. The system of clause 11, wherein causing the ATM to present the busy ATM experience comprises causing the ATM to present, via the second graphical user interface, a prompt for the user to use cardless capabilities of the ATM.

Clause 20. The system of clause 11, wherein the machine learning model comprises a neural network. The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automated teller machine (ATM), comprising:
one or more processors; and
memory in communication with the one or more processors and storing instructions that are configured to cause the ATM to:
generate a busyness score over a predetermined period;
determine whether the busyness score exceeds a busyness score threshold;
when the busyness score does not exceed the busyness score threshold:
cause the ATM to present, via a first graphical user interface, a custom cash withdrawal option;
dispense an amount of cash corresponding to the custom cash withdrawal option; and
when the busyness score exceeds the busyness score threshold:
cause the ATM to present, via a second graphical user interface, one or more predefined cash withdrawal options; and
dispense an amount of cash corresponding to the one or more predefined cash withdrawal options.

2. The ATM of claim 1, wherein the instructions when executed by the one or more processors are further configured to cause the ATM to present the custom cash withdrawal option before the one or more predefined cash withdrawal options when the busyness score for the ATM does not exceed the busyness score threshold.

3. The ATM of claim 2, wherein the instructions when executed by the one or more processors are further configured to cause the ATM to present the one or more predefined cash withdrawal options before the custom cash withdrawal option when the busyness score for the ATM exceeds the busyness score threshold.

4. The ATM of claim 1, wherein the instructions when executed by the one or more processors are further configured to cause the ATM to present one or more first requests for each individual check total being deposited when the busyness score for the ATM does not exceed the busyness score threshold.

5. The ATM of claim 4, wherein the instructions when executed by the one or more processors are further configured to cause the ATM to present only a second request for a total value of all checks being deposited when the busyness score for the ATM exceeds the busyness score threshold.

6. The ATM of claim 1, wherein the instructions when executed by the one or more processors are further configured to cause the ATM to present, via the second graphical user interface, an option to authenticate a user using a mobile device or a quick response (QR) code to allow the user to pre-stage a transaction using the mobile device when the busyness score for the ATM exceeds the busyness score threshold.

7. The ATM of claim 1, wherein the busyness score is generated by a machine learning model, and the machine learning model comprises a neural network.

8. An automated teller machine (ATM) comprising:
one or more processors; and
memory in communication with the one or more processors and storing instructions that are configured to cause the ATM to:
generate a busyness score over a predetermined period;
determine whether the busyness score exceeds a first busyness score threshold;
determine whether the busyness score exceeds a second busyness score threshold;
when the busyness score does not exceed the first busyness score threshold, cause the ATM to present, via a first graphical user interface, a default ATM experience;
when the busyness score exceeds the first busyness score threshold but does not exceed the second busyness score threshold, cause the ATM to present, via a second graphical user interface, a hybrid ATM experience;
when the busyness score exceeds the second busyness score threshold, cause the ATM to present via, a third graphical user interface, a busy ATM experience; and
dispense an amount of cash corresponding to a selection of a custom cash withdrawal or one or more predefined cash withdrawals on the first, second, or third graphical user interfaces.

9. The ATM of claim 8, wherein causing the ATM to present the default ATM experience comprises causing the ATM to present, via the first graphical user interface, an advertisement, educational content, or both to a user, and a custom cash withdrawal option presented before one or more predefined cash withdrawal options.

10. The ATM of claim 9, wherein:
causing the ATM to present the hybrid ATM experience comprises causing the ATM to present the custom cash withdrawal option before one or more predefined cash withdrawal options without presenting the advertisement or the educational content, and causing the ATM to present the busy ATM experience comprises causing the ATM to omit the advertisement or the educational content.

11. An automated teller machine (ATM), comprising:

one or more processors; and memory in communication with the one or more processors and storing instructions that are configured to cause the ATM to:

generate a busyness score over a predetermined period;

determine whether the busyness score exceeds a busyness score threshold;

when the busyness score does not exceed the busyness score threshold, cause the ATM to present, via a first graphical user interface, a default ATM experience;

when the busyness score exceeds the busyness score threshold, cause the ATM to present via, a second graphical user interface, a busy ATM experience; and dispense an amount of cash corresponding to a custom cash withdrawal or one or more predefined cash withdrawals based on input to the first or second graphical user interfaces.

12. The ATM of claim 11, wherein causing the ATM to present the default ATM experience comprises causing the ATM to present, via the first graphical user interface, an advertisement, educational content, or both to a user, and a custom cash withdrawal option.

13. The ATM of claim 12, wherein causing the ATM to present the advertisement or educational content to the user occurs prior to presenting the user with options for conducting a transaction.

14. The ATM of claim 12, wherein the busy ATM experience omits the advertisement, educational content, or both.

15. The ATM of claim 11, wherein causing the ATM to present the default ATM experience comprises causing the ATM to present, via the first graphical user interface, a custom cash withdrawal option before one or more predefined cash withdrawal options.

16. The ATM of claim 15, wherein causing the ATM to present the busy ATM experience comprises causing the ATM to present, via the second graphical user interface, the one or more predefined cash withdrawal options before the custom cash withdrawal option.

17. The ATM of claim 11, wherein causing the ATM to present the default ATM experience comprises causing the ATM to present, via the first graphical user interface, one or more first requests for each individual check total being deposited.

18. The ATM of claim 17, wherein causing the ATM to present the busy ATM experience comprises causing the ATM to present, via the second graphical user interface, only a second request for a total value of all checks being deposited.

19. The ATM of claim 11, wherein causing the ATM to present the busy ATM experience comprises causing the ATM to present, via the second graphical user interface, a quick response (QR) code to allow the user to pre-stage a transaction using a mobile device or an option to authenticate via a mobile device.

20. The ATM of claim 11, wherein the busyness score is generated by a machine learning model, and the machine learning model comprises a neural network.

* * * * *